(12) United States Patent
Dowell et al.

(10) Patent No.: US 11,698,050 B2
(45) Date of Patent: Jul. 11, 2023

(54) SYSTEM AND METHOD FOR OIL SUPPLY TO PUMP

(71) Applicant: Powerhouse Engine Solutions Switzerland IP Holding GmbH, Zug (CH)

(72) Inventors: John Patrick Dowell, Grove City, PA (US); Ganesasubramanian Murugesan, Bangalore (IN)

(73) Assignee: Powerhouse Engine Solutions Switzerland IP Holding GmbH, Zug (CH)

( * ) Notice: Subject to any disclaimer, the term of this patent is extended or adjusted under 35 U.S.C. 154(b) by 280 days.

(21) Appl. No.: 17/021,933

(22) Filed: Sep. 15, 2020

(65) Prior Publication Data
US 2022/0010759 A1     Jan. 13, 2022

(30) Foreign Application Priority Data
Jul. 13, 2020   (IN) .............................. 202041029634

(51) Int. Cl.
     *F02M 63/00*      (2006.01)
     *F02M 59/44*      (2006.01)
     *F01M 1/16*      (2006.01)
     *F02M 63/02*      (2006.01)

(52) U.S. Cl.
     CPC .......... *F02M 63/0001* (2013.01); *F01M 1/16* (2013.01); *F02M 59/44* (2013.01); *F02M 63/0265* (2013.01); *F02M 2200/02* (2013.01)

(58) Field of Classification Search
CPC ............... F02M 63/0001; F02M 59/44; F02M 63/0265; F02M 2200/02; F01M 1/16
See application file for complete search history.

(56) References Cited

U.S. PATENT DOCUMENTS

| | | | |
|---|---|---|---|
| 3,204,406 A | 9/1965 | Howes et al. | |
| 4,198,948 A * | 4/1980 | Conrad | F02M 63/0001 |
| | | | 123/495 |
| 4,245,969 A * | 1/1981 | Caslow | F04C 2/086 |
| | | | 29/888.023 |
| 4,530,331 A * | 7/1985 | Gibson | F16H 1/28 |
| | | | 123/450 |
| 4,993,979 A | 2/1991 | Bland et al. | |

(Continued)

FOREIGN PATENT DOCUMENTS

| | | |
|---|---|---|
| EP | 0030597 A1 | 6/1981 |
| EP | 2088310 A1 | 8/2009 |

(Continued)

OTHER PUBLICATIONS

Federal Institute of Industrial Property, Search Report Issued in Application No. 202092381, dated Feb. 18, 2022, 5 pages.

(Continued)

*Primary Examiner* — Logan M Kraft
*Assistant Examiner* — John D Bailey
(74) *Attorney, Agent, or Firm* — McCoy Russell LLP (57) ABSTRACT

Systems and methods for supplying lubricating oil to a high-pressure fuel pump of an engine fuel system. In one embodiment, a system may include a plurality of channels routing lubricating oil to a gear system and drive shaft of a pump without flowing an entire volume of the lubricating oil through a cavity of the drive shaft.

20 Claims, 6 Drawing Sheets

(56) References Cited

U.S. PATENT DOCUMENTS

| | | | | | |
|---|---|---|---|---|---|
| 5,092,292 | A | * | 3/1992 | Iguchi | F02B 75/16 |
| | | | | | 123/196 R |
| 5,495,833 | A | * | 3/1996 | Ishizaka | F01M 1/02 |
| | | | | | 184/5 |
| 5,975,041 | A | * | 11/1999 | Narita | F01M 1/12 |
| | | | | | 123/196 R |
| 5,992,393 | A | * | 11/1999 | Yoshida | F02B 75/22 |
| | | | | | 123/54.4 |
| 6,537,115 | B2 | * | 3/2003 | Suganuma | F02B 67/06 |
| | | | | | 123/198 C |
| 7,171,939 | B1 | * | 2/2007 | Tiller | F01L 1/026 |
| | | | | | 123/90.31 |
| 7,240,656 | B2 | * | 7/2007 | Yamane | F04C 15/0088 |
| | | | | | 123/198 C |
| 7,513,812 | B1 | * | 4/2009 | Hochmayr | B63B 21/14 |
| | | | | | 123/192.2 |
| 7,703,423 | B2 | * | 4/2010 | Burgess | F01M 1/06 |
| | | | | | 123/90.39 |
| 7,905,212 | B2 | * | 3/2011 | Ohsawa | F16F 15/265 |
| | | | | | 123/196 R |
| 8,307,802 | B2 | * | 11/2012 | Marzy | F16F 15/264 |
| | | | | | 123/198 C |
| 8,366,575 | B2 | * | 2/2013 | Ariga | F16H 57/0471 |
| | | | | | 123/196 R |
| 8,910,610 | B2 | * | 12/2014 | Thayer | F01M 1/02 |
| | | | | | 123/198 C |
| 2005/0106044 | A1 | * | 5/2005 | Ohnishi | F04C 15/0049 |
| | | | | | 417/440 |
| 2007/0272196 | A1 | * | 11/2007 | Nishi | F16H 57/043 |
| | | | | | 123/197.1 |
| 2008/0011263 | A1 | * | 1/2008 | Klose | F16D 23/04 |
| | | | | | 123/196 R |
| 2012/0138003 | A1 | * | 6/2012 | Petry-Johnson | F01L 1/026 |
| | | | | | 123/90.31 |
| 2015/0075498 | A1 | | 3/2015 | Unes et al. | |
| 2015/0367924 | A1 | * | 12/2015 | Davis | B63H 20/24 |
| | | | | | 440/53 |
| 2016/0076504 | A1 | | 3/2016 | Anandhan et al. | |
| 2016/0265652 | A1 | * | 9/2016 | Nishimine | B60K 6/365 |
| 2016/0298625 | A1 | * | 10/2016 | Sakai | F04C 2/102 |
| 2017/0097019 | A1 | * | 4/2017 | Afshari | F04C 11/008 |
| 2018/0045294 | A1 | * | 2/2018 | Hori | B60K 6/445 |
| 2018/0202528 | A1 | * | 7/2018 | Buschur | F02B 39/08 |
| 2019/0345870 | A1 | * | 11/2019 | Davis | B63H 20/00 |
| 2022/0010751 | A1 | * | 1/2022 | Murugesan | F02F 7/0046 |

FOREIGN PATENT DOCUMENTS

| | | |
|---|---|---|
| JP | 2009287529 A | 12/2009 |
| JP | 2011058430 A | 3/2011 |
| RU | 2618361 C1 | 5/2017 |
| SU | 1588878 A1 | 8/1990 |
| WO | 2011088958 A1 | 7/2011 |
| WO | 2019151038 A1 | 8/2019 |

OTHER PUBLICATIONS

Intellectual Property India, Examination Report Issued in Application No. 202041029634, dated Mar. 15, 2022, 6 pages.

* cited by examiner

SYSTEM AND METHOD FOR OIL SUPPLY TO PUMP

CROSS REFERENCE TO RELATED APPLICATION

The present application claims priority to Indian Patent Application No. 202041029634, entitled "SYSTEM AND METHOD FOR OIL SUPPLY TO PUMP", and filed on Jul. 13, 2020. The entire contents of the above-listed application is hereby incorporated by reference for all purposes.

BACKGROUND

Technical Field

Embodiments of the subject matter disclosed herein relate to supplying lubricating oil to a high-pressure fuel pump.

Discussion of Art

Vehicles, such as rail vehicles, include power sources, such as reciprocating internal combustion diesel engines. In some vehicles, fuel is provided to the diesel engine by a common rail fuel system. One type of common rail fuel system comprises a low-pressure fuel pump in fluidic communication with a high-pressure fuel pump, and a fuel rail in fluidic communication with the high-pressure fuel pump and further in fluidic communication with at least one fuel injector fitted in to at least one engine cylinder. The high-pressure fuel pump pressurizes fuel for delivery to the fuel injector through the fuel rail. Fuel travels through the fuel rail to at least one fuel injector, and ultimately to at least one engine cylinder of the power source such as an engine where fuel is combusted to provide power to the vehicle. Lubricating oil is supplied to the components of the high-pressure fuel pump to reduce friction between the mechanical parts and thereby reduce wear.

Flow of pressurized oil through the internal cavity of the drive shaft may cause the pressure difference across the large area of the cavity to increase. A pressure difference may be created between two ends of the cavity. The pressure difference may force the gear hub to exert pressure on the forward end cover proximal to the second bushing, thereby restricting flow of oil to the second bushing and the thrust faces of the gear. Due to the reduced oil flow to the second bushing and thrust faces of the gear, thrust load may increase at the second bushing and thrust faces of the gear. The lack of uniform lubrication and the increased thrust load on the HPFP components may cause accelerated mechanical wear and degradation of the components. It may be desirable to have a system and method that differs from those that are currently available.

BRIEF DESCRIPTION

In one embodiment, a system for an engine may include a plurality of channels routing lubricating oil to a gear system and a drive shaft of a pump without flowing an entire volume of the lubricating oil through a cavity of the drive shaft.

BRIEF DESCRIPTION OF THE FIGURES

FIGS. 2-5B are shown to scale, although other relative dimensions may be used, if desired.

DETAILED DESCRIPTION

The following description relates to supplying lubricating oil to components of a high pressure fuel pump (HPFP).

In one embodiment, the high-pressure fuel pump (HPFP) may include a gear system including a gear housed hub within a gear and thrust faces on each side of the gear, the gear hub engaged to a splined drive shaft. The splined drive shaft may include a central cavity. A first bushing and a second bushing may be provided at interfaces of the gear system and a casting (end cover) of the HPFP. An inlet for lubricating oil may be provided on the surface of the gear hub in contact with the first bushing and the drive shaft and an outlet for the oil may be provided on the surface of the gear hub in contact with the second bushing and end cover. Pressurized oil may enter the internal cavity of the drive shaft via the inlet and flow to the first bushing, the gear, the thrust faces of the gear, and to the second bushing.

In one example, a system for an engine may include a plurality of channels routing lubricating oil to a gear system and drive shaft of a pump without flowing an entire volume of the lubricating oil through a cavity of the drive shaft. In this way, by routing the pressurized oil to the bushings without flowing through the internal cavity of the drive shaft, the thrust load on the thrust faces and one or more bushings may be reduced.

In none embodiment, a set of channels may be formed in the forward end cover of the HPFP around the gear and the gear hub. The set of channels may include a first vertical channel on a first side of the gear proximal to the drive shaft, a second horizontal channel spanning above the gear, and a third vertical channel on a second side of the gear distal from the drive shaft. The third vertical channel may intersect with a bore in the end cover surrounding the gear hub. Pressurized oil may be supplied to the first vertical channel via an inlet and from thereon, a portion of the oil may flow to the bore in the end cover via the second horizontal channel and the third vertical channel, and another portion of the oil may flow to the gear, gear shaft, drive shaft, a thrust face of gear, and the first bushing via an outlet. One or more holes may be formed on the second bushing for fluidic communication of the bushing with the third vertical channel via the bore. Oil from the third vertical channel may be supplied to the gear, gear shaft, another thrust face of gear, and the second bushing via the bore in the end cover. After flowing through the HPFP components, the oil may drain down from clearance areas between the components such as around the gear.

By routing oil through channels formed in the end cover of the HPFP, the entire volume of pressurized oil may be averted from entering the internal cavity of the drive shaft, thereby reducing or eliminating a pressure difference between two ends of the cavity. By reducing the pressure difference, exertion of force on the end cover proximal to the second bushing may be reduced and oil may flow to the second bushing and thrust faces of the gear without hindrance. The technical effect of facilitating uniform and uninterrupted oil flow to each of the bushings and the thrust faces is that thrust load on the bushings and thrust faces may be lower or negligible, thereby decreasing the possibility of mechanical wear. Overall, by ensuring uniform distribution of lubricating oil to each HPFP component, wear due to friction may be reduced and long term operation of the HPFP may be improved.

Engine systems according to embodiments of the invention may be suitable for use in mobile applications and stationary applications. Suitable stationary applications may include stationary power generation applications. Suitable mobile applications may include vehicles, such as may be used in the rail, mining, marine, aviation, trucking, and related industrial markets. A locomotive that is configured for the rail market is used herein for illustration purposes. The rail market may include mainline freight haulage, passenger rail, switchers, shunters, and the like.

Figure 1:
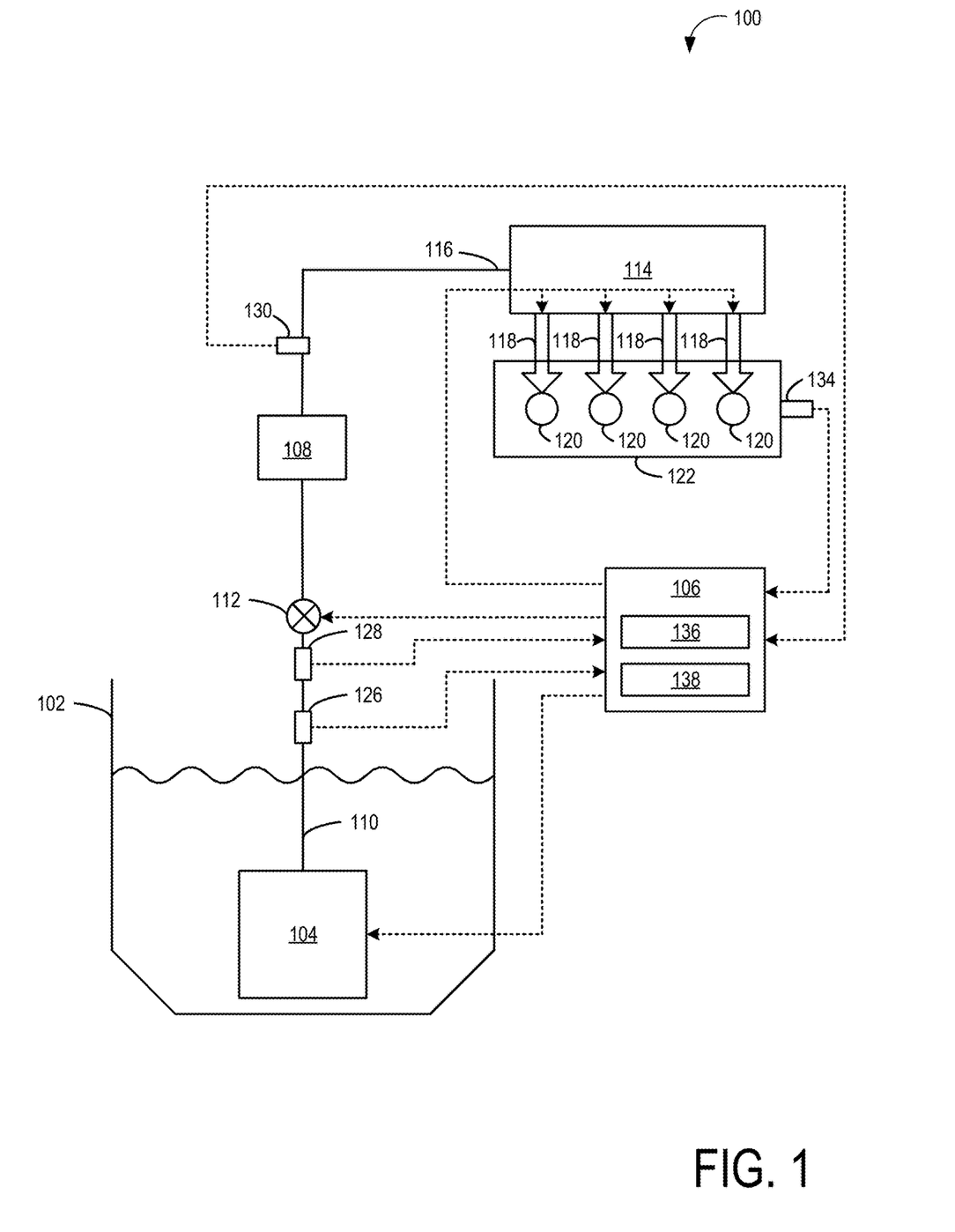
FIG. 1 shows a common rail fuel system including a high-pressure fuel pump.
Figure 2:
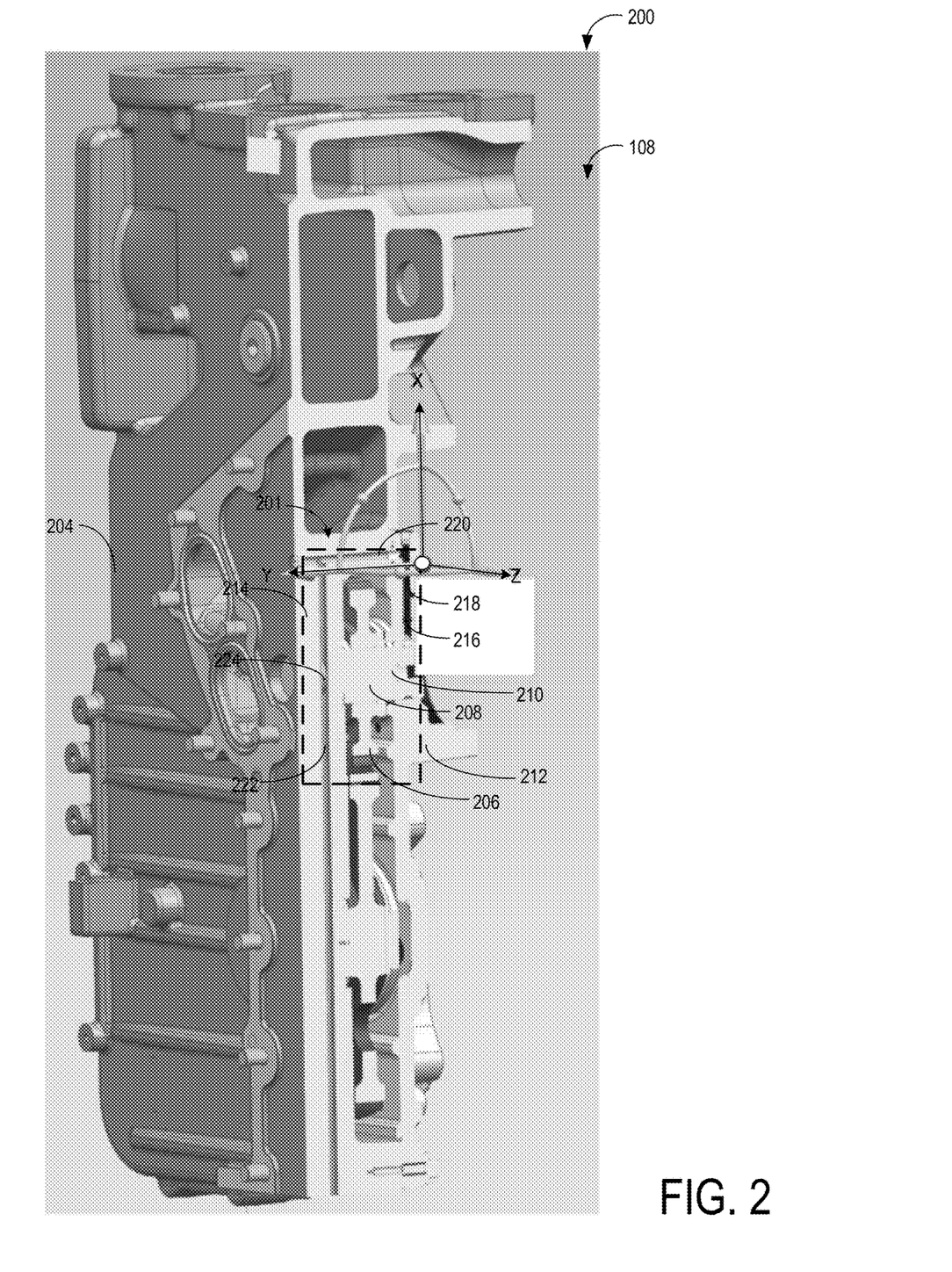
FIG. 2 shows a first cross-sectional view of a high-pressure fuel pump.
Figure 3:
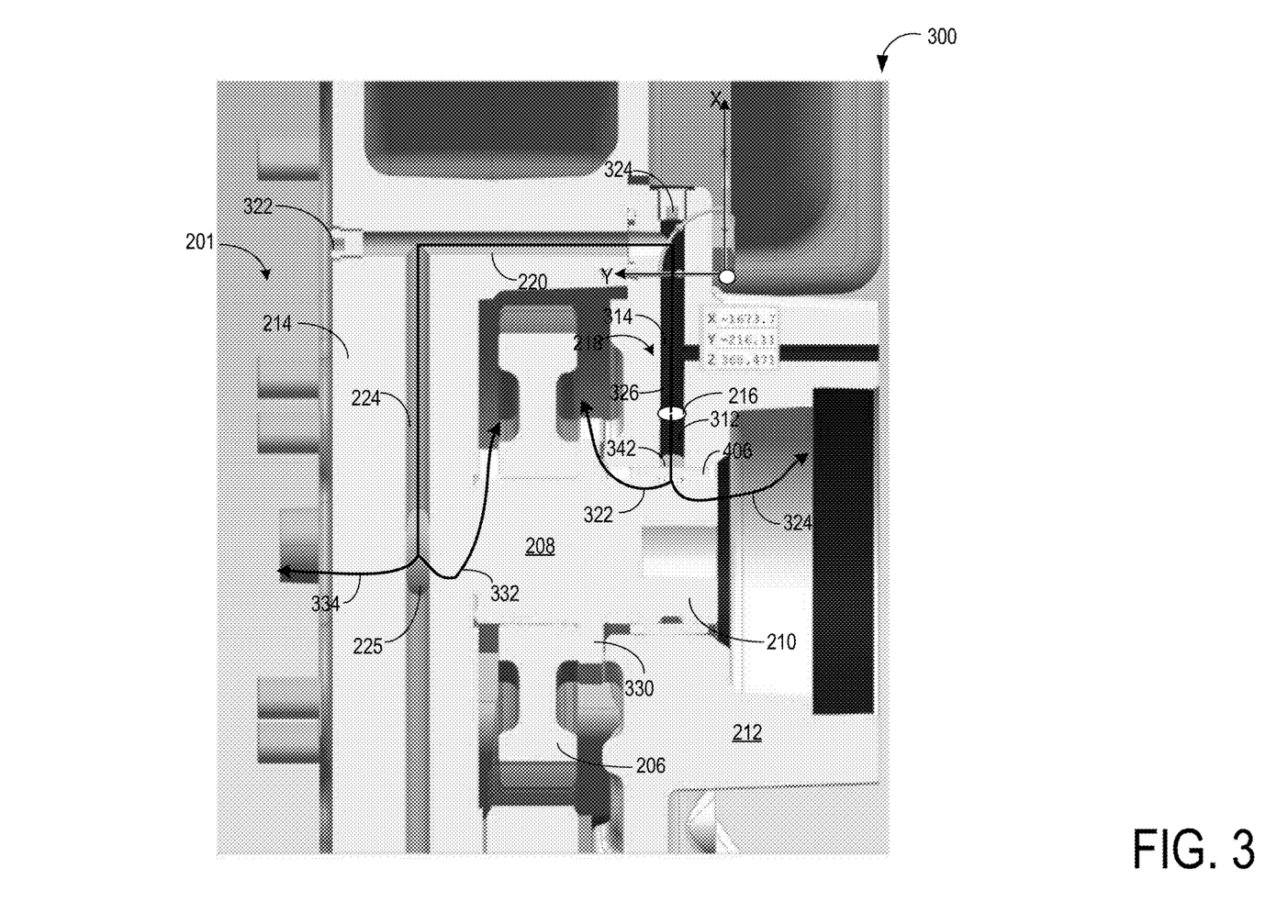
FIG. 3 shows drillings in the high-pressure fuel pump to channelize lubricating oil through the high-pressure fuel pump.
Figure 4:
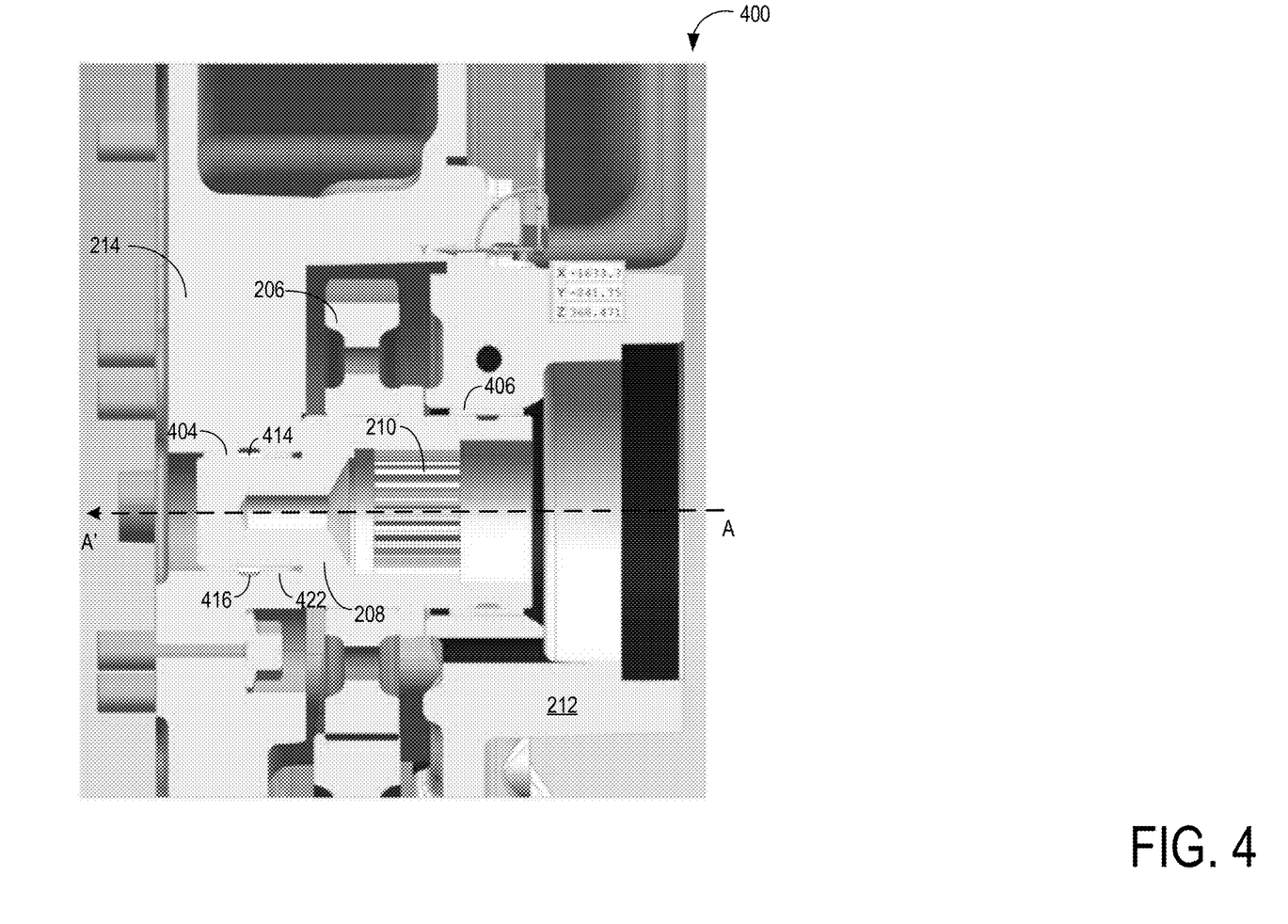
FIG. 4 shows a second cross-sectional view of a portion of the high-pressure fuel pump.
Figure 5A:
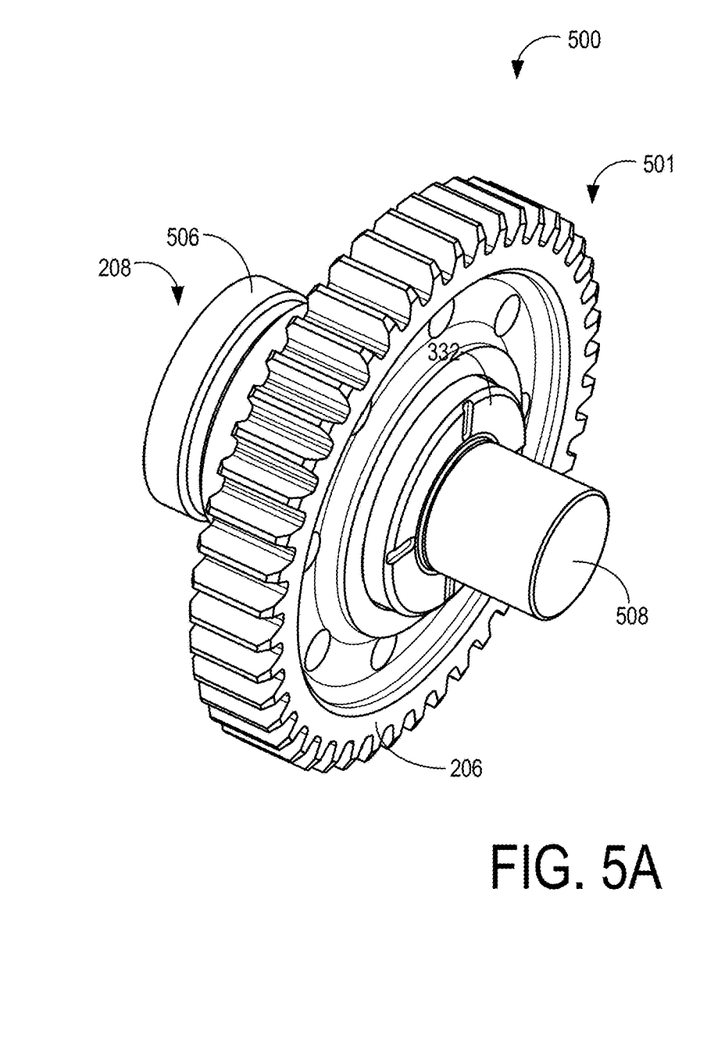
FIG. 5A shows a first perspective view of a gear system used within the high-pressure fuel pump.
Figure 5B:
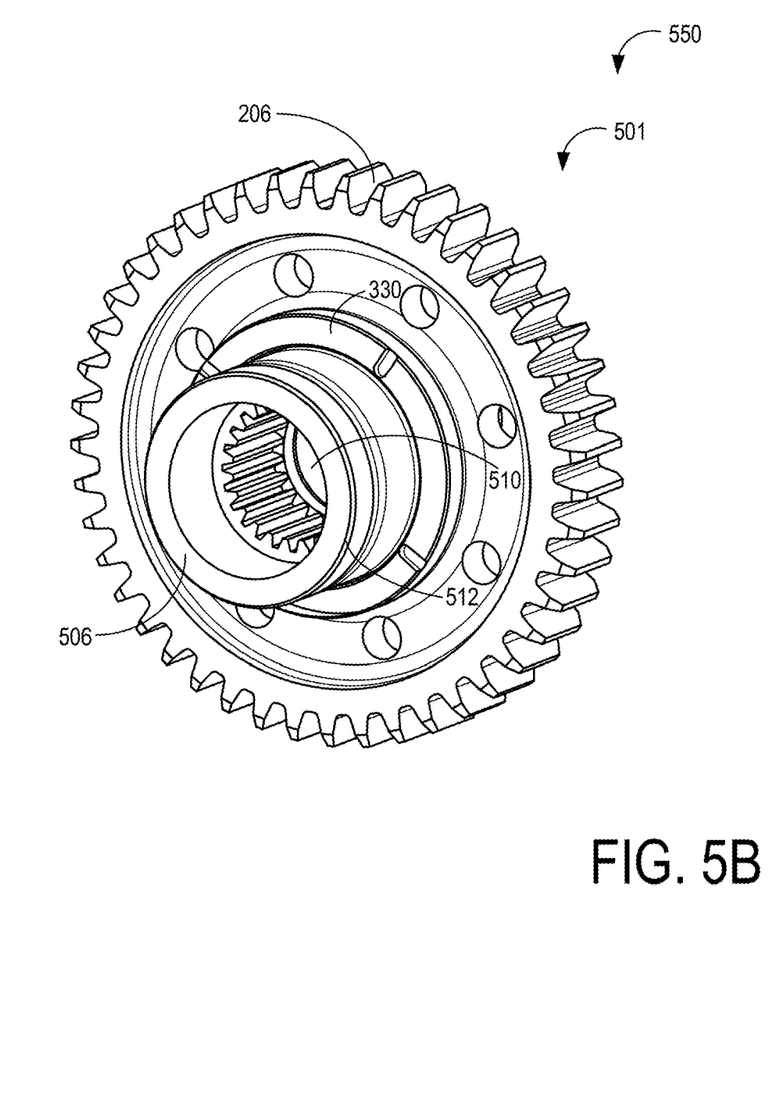
FIG. 5B shows a second perspective view of the gear system used within the high-pressure fuel pump.
Figure 6:
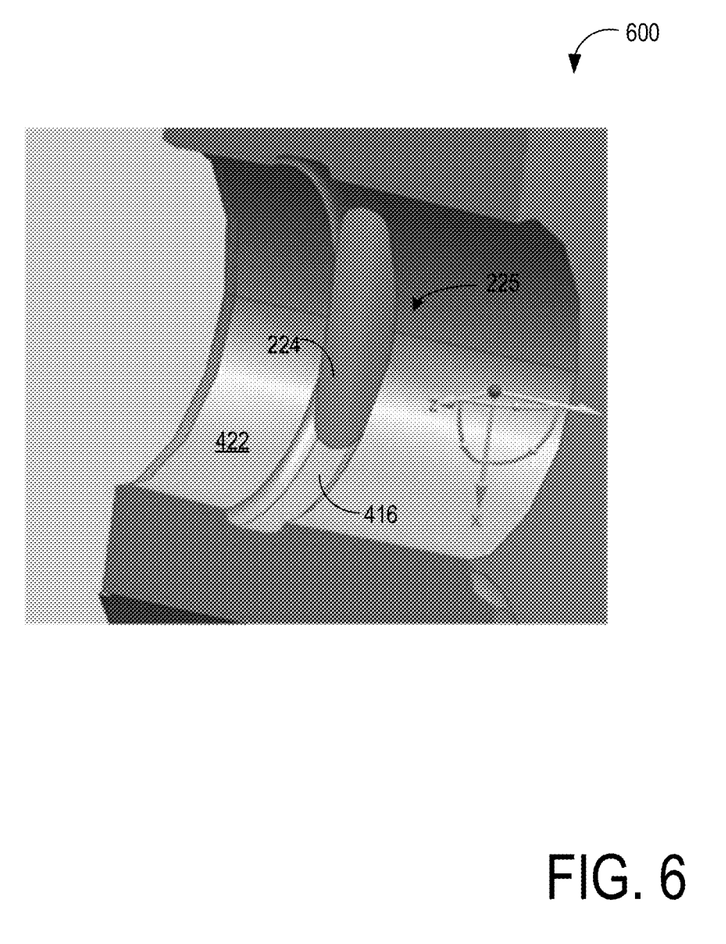
FIG. 6 shows an example view of a groove supplying lubricating oil to components of the high-pressure fuel pump.

The HPFP may be incorporated in fuel delivery system, as shown in FIG. 1 of a vehicle such as a locomotive vehicle. During operation of the HPFP, lubricating oil may be supplied to the components of the HPFP including a gear system, as shown in FIGS. 5A and 5B, and bushings positioned at interfaces of the gear system and casting of the HPFP. The pathway for oil supply to these components are shown in FIGS. 2-3, 6. The bushings around the gear system are shown in FIG. 4.

FIG. 1 includes a block diagram of a common rail fuel system (CRFS) 100 for an engine of a vehicle. In the illustrated embodiment, the vehicle system is a rail vehicle 106 (e.g., locomotive). In alternative embodiments, the engine may be in another type of off-highway vehicle, on-highway vehicle, stationary power plant, marine vessel, or others. Liquid fuel is sourced or stored in a fuel tank 102. A low-pressure fuel pump 104 is in fluid communication with the fuel tank 102. In this embodiment, the low-pressure fuel pump 104 is disposed inside of the fuel tank 102 and can be immersed below the liquid fuel level. In alternative embodiments, the low-pressure fuel pump may be coupled to the outside of the fuel tank and pump fuel through a suction device or feature. Operation of the low-pressure fuel pump 104 is regulated by a controller 106 (such as an ECU or ECM). The low pressure fuel pump 104 may be any one of engine driven (through cam, gear, belt, chain or such other drive mechanism) or independent electrically or hydraulically driven.

Liquid fuel is pumped by the low-pressure fuel pump 104 from the fuel tank 102 to a high-pressure fuel pump 108 through a conduit 110. A valve 112 is disposed in the conduit 110 and regulates fuel flow through the conduit 110. For example, the valve 112 is an inlet metering valve (MV). The IMV 112 is disposed upstream of the high-pressure fuel pump 108 to adjust a flow rate, and to meter the appropriate quantity, of fuel that is provided to the high-pressure fuel pump 108 and further to a common fuel rail 114 for distribution to a plurality of fuel injectors 118 for fuel injection into the engine cylinders. The controller 106 may command the IMV to be fully closed, fully open, or a position in between fully closed and fully opened in order to control fuel flow to the high-pressure fuel pump 108 to a commanded fuel flow rate as dictated by the controller 106. During operation of the vehicle/engine, the IMV 112 is adjusted to meter fuel based on operating conditions, and during at least some conditions may be at least partially open.

The high-pressure fuel pump (HPFP) 108 increases fuel pressure from a lower pressure to a higher pressure. The HPFP 108 is fluidly coupled with the common fuel rail 114. In one example, the pump 108 includes four pumping chambers (and four corresponding check valves) and the engine includes 16 cylinders.

Components of the HPFP 108 may be supplied with pressurized lubricating oil to lubricate the moving components for reduction of friction and consequently that of mechanical wear. The HPFP 108 may include a gear enclosing a gear hub, a drive shaft meshed within the gear hub, one or more bushings at interfaces of the gear hub and an end cover of the HPFP, and a passage in the end cover of the HPFP for supplying pressurized lubricating oil to the gear, the gear hub, the one or more bushings, and the drive shaft, the passage continuing around the gear from a first side of the gear hub to a second side of the gear hub. The passage may include a first vertical passage on a first side of the gear hub, a third vertical passage on a second side of the gear hub, and a second horizontal passage connecting the first vertical passage to the third vertical passage. The first vertical passage may include an inlet located along the length of the first vertical passage with oil entering through the inlet travelling in two directions along the first vertical passage. A first portion of oil entering the first vertical passage may travel to a first bushing, the first side of gear hub, a first side of the gear, a first thrust face, and the drive shaft via an outlet while a second portion of oil entering the first vertical passage may travel to the third vertical channel via the second horizontal channel. The third vertical channel tangentially may intersect a bore in the end cover, the bore supplying oil from the third vertical channel to a second side of the gear, the second side of the gear hub, a second thrust face, the end cover, and a second bushing. The second bushing includes at least one through hole in fluidic communication with the bore. In this way, pressurized oil may be supplied to the HPFP 108 components without the oil being routed through a central cavity of the drive shaft, thereby avoiding formation of pressure differences across the cavity and consequently thrust loads on one or more bushings and thrust faces.

A plurality of fuel injectors 118 are in fluid communication with the common fuel rail 114. Each of the plurality of fuel injectors 118 delivers fuel to one of a plurality of engine cylinders 120 in an engine 122. Fuel is combusted in the plurality of engine cylinders 120 to provide power to the vehicle through an alternator and traction motors, for example. Operation of the plurality of fuel injectors 118 is regulated by the controller 106. In the embodiment of FIG. 1, the engine 122 includes four fuel injectors and four engine cylinders. In alternate embodiments, more or fewer fuel injectors and engine cylinders can be included in the engine.

Fuel pumped from the fuel tank 102 to an inlet of the IMV 112 by the low-pressure fuel pump 104 may operate at what is referred to as a lower fuel pressure or supply fuel pressure. Correspondingly, components of the CRFS 100 which are upstream of the high-pressure fuel pump 108 operate in a lower fuel pressure or supply fuel pressure region. On the other hand, the high-pressure fuel pump 108 may pump fuel from the lower fuel pressure to a higher fuel pressure or rail fuel pressure. Correspondingly, components of the CRFS 100 which are downstream of the high-pressure fuel pump 108 are in a higher-fuel pressure or rail fuel pressure region of the CRFS 100. Typically, in high pressure common rail fuel systems such as the system according to the disclosure, the rail fuel pressure is very close to or slightly higher than the final fuel pressure at which the fuel is injected into each engine cylinder.

A fuel pressure in the lower fuel pressure region is measured by a pressure sensor 126 that is positioned in the conduit 110. The pressure sensor 126 sends a pressure signal to the controller 106. A fuel temperature in the lower fuel pressure region is measured by a temperature sensor 128 that is positioned in conduit 110. The temperature sensor 128 sends a temperature signal to the controller 106. A fuel pressure in the higher fuel pressure region is measured by a pressure sensor 130 that is positioned in the conduit 116. The pressure sensor 130 sends a pressure signal to the controller 106. Note that in some applications various operating parameters may be generally determined or derived indirectly in addition to or as opposed to being measured directly.

In addition to the sensors mentioned above, the controller 106 receives various signals from a plurality of engine sensors 134 coupled to the engine 122 that may be used for assessment of fuel control health and associated engine operation. For example, the controller 106 receives sensor signals indicative of engine in-cylinder air-fuel ratio, engine speed, engine load, engine temperature, ambient temperature, fuel value, a number of cylinders actively combusting fuel, etc. In the illustrated implementation, the controller 106 is a computing device, such as microcomputer that includes a processor unit 136, non-transitory computer-readable storage medium device 138, input/output ports, memory, and a data bus. Computer-readable storage medium 138 included in the controller 106 is programmable with computer readable data representing instructions executable by the processor for performing the control routines and methods described below as well as other variants that are not specifically listed. The controller 106 is operable to adjust various actuators in the CRFS 100 based on different operating parameters received or derived from different signals acquired from the various sensors.

FIG. 2 shows a first cross-sectional view 200 of a high-pressure fuel pump (HPFP) 108 showing channels for supplying lubricating oil to the HPFP. The cross-section may be taken along the x-y plane of the HPHP 108. A portion 201 of the cross-section of the HPFP is magnified in FIG. 3. FIG. 3 shows an example view 300 of drillings in the HPFP 108 to channelize lubricating oil through the HPFP 108. The cross-sectional of the HPFP shown in FIG. 3 may be taken off-centered from the central axis of a drive shaft 210 of the HPFP 108. Another cross-section (view 400) of the HPFP, as shown in FIG. 4, may be taken along the central axis A-A' of a drive shaft 210 of the HPFP 108.

The HPFP 108 may include a gear system including a gear 206 positioned between a first end cover 212 on a first side and a second end cover of the HPFP 108. A first thrust face 330 and as second thrust face 232 may be present on either one side of the gear 206, respectively. The gear 206 may be fitted around a gear hub 208. The gear hub 208 may include a toothed inner circumference meshing with a splined drive shaft 210 of the HPFP 108. The splined drive shaft 210 may protrude within the gear hub 208 from an end of the gear hub 208 proximal to the first thrust face 330 and the splined drive shaft 210 may not extend (within the gear hub 208) up to the second thrust face 232 of the gear 206. The rotation of the drive shaft 210 may cause the gear 206 to rotate about its central axis. The drive shaft 210 may be hollow in the center and may include a central hollow internal cavity. The details of the gear 206 and the gear hub 208 is further elaborated in FIGS. 5A-B.

A first bushing 406 may be positioned at an interface of the first end cover 212 and the gear hub 208 on one side of the gear 206. A second bushing 404 may be positioned at an interface of the second end cover 214 and the gear hub 208 on another side of the gear 206. The second bushing may sit on a bore 422 around the gear hub 208. In one example, the first bushing 406 may be a 78 mm bushing while the second bushing may be a 44 mm bushing. During operation of the HPFP, lubricating oil is to be uniformly supplied to the HPFP components including the first bushing 406 and the second bushing 404.

The lubricating oil may be supplied to the HPFP components via a plurality of channels vertically and horizontally passing through the first end cover 212 and a second end cover 213. The plurality of channels may be off-centered relative to the central axis A-A' of the drive shaft 210. Since the plurality of channels are off-centered, they are visible in FIG. 3 which shows a cross-section of the HPFP taken off-centered from the central axis of a drive shaft 210 of the HPFP 108. Whereas since FIG. 4 shows a cross-section of the HPFP taken along the central axis A-A' of a drive shaft 210 of the HPFP 108, and the plurality of channels are no longer visible in FIG. 4.

The plurality of channels may include a first vertical channel 218 drilled in the first end cover 212. The first vertical channel 218 may originate from the interface of the drive shaft 210 and the first bushing 406 and extend along the positive x-axis away from the drive shaft 210 on a first side of the gear 206. The first vertical channel 218 may lead to a second horizontal channel 220 spanning from the first side of the gear 206 to another side of the gear 206 along the positive y-axis. The second horizontal channel 220 may continue to a third vertical channel 224 extending longitudinally along the negative x-axis from the second horizontal channel 220 through the second of the first end cover 214. The first vertical channel 218 may be plugged at one end 324 proximal to the second horizontal channel 220 and the second horizontal channel 220 may be plugged at one end proximal to the third vertical channel 224.

An oil inlet 216 may lead to the first vertical channel 218 through which pressurized oil may enter the first vertical channel 218. The pressurized oil may be supplied to the oil inlet 216 from an oil sump. Upon entering the oil may split into two portions with a first portion travelling along a first section 312 of the first vertical channel 218. The first portion of the oil may be delivered to the first bushing 406, the gear 206, and the gear hub 208 (as shown by arrow 322) and to the drive shaft (as shown by arrow 324) via an outlet 342 positioned at the interface of the first vertical channel 218 and the first bushing 406. The second portion of the oil may flow along a second section 314 of the first vertical channel 218 and enter the second horizontal channel 220. Due to the end 324 of the first vertical channel 218 being plugged, the entire volume of oil travelling through the second section 314 of the first vertical channel 218 may enter the second horizontal channel 220 and from thereon flow to the third vertical channel 224. Due to the end 322 of the second horizontal channel 220 being plugged, the entire volume of oil travelling through the second horizontal channel 220 may enter the third vertical channel 224.

FIG. 6 shows an example view 600 of the bore 422 surrounding the gear hub 208 (without the second bushing sitting on the bore). The bore 422 may include a groove 416 for routing lubricating oil from the third vertical channel 224 to the gear 206 and the gear hub 208 and the second bushing 404. The groove 416 is formed along the inner circumference (360°) of the bore 422. The second bushing 404 may include one or more holes 414 on the wall of the bushing in fluidic communication with the groove 416. Since the groove 416 is formed around the bore, the holes 414 on the wall of the second bushing may be placed at any position along the bore 422.

The third vertical channel 224 may intersect the groove 416 tangentially and not pass through the center of the bore 422. The groove 416 on the bore 422 may be machined out and third vertical channel 224 may be a gun drilled long channel. The groove 416 may intersect the third vertical channel 224 at the point of intersection 225 to form the fluid connection. Oil from the third vertical channel 224 may flow to the groove 416 and from thereon to the bore 422.

Oil from the bore 422 may flow to the gear 206 and the gear hub 208 through the groove 416 (as shown by arrow 332) and further to the second bushing 404 via through holes 414 on the wall of the bushing via the bore 422. Oil from the third vertical channel 224 may also flow towards the outer edge of the second end cover 214 via the groove 416, as shown by arrow 334. After flowing through each of the gear 206, the gear hub 208, thrust faces of the gear, and the drive shaft 210, the oil may drain back through clearances and cavities between the components.

In this way, by routing pressurized oil through dedicated channels formed around the drive shaft and the gear system, the entire volume of pressurized oil may no longer be routed through the central cavity of the drive shaft. By averting flow of oil through the cavity, a large pressurized area may not be formed and exertion of force on the forward end cover proximal to the second bushing may be reduced causing the oil to flow to the second bushing and thrust faces of the gear. By flowing oil flow to each of the bushings and the thrust faces, thrust load on the bushings and thrust faces may be decreased, thereby decreasing the possibility of mechanical wear.

FIG. 5A shows a first perspective view 500 and FIG. 5B shows a second perspective view 550 of a gear system 501 used within the high-pressure fuel pump. The gear system 501 may include a gear hub 208 coupled within a gear 206.

The gear hub 208 may be divided into two parts with a first part 506 protruding out of a first side of the gear 206 and a second part 508 protruding out of a second side of the gear 206. The first part 506 and the second part 508 may be a continuous structure connected at the central opening of the gear. The diameter of the first part 506 may be larger than that of the second part 508. A first thrust face 330 attached to the first part 506 of the gear hub 208 may be positioned at an interface of the gear hub 208 and the gear 206 at one side of the gear. The diameter of the first thrust face 330 may be larger than that of the first part 506 of the gear hub 208. A second thrust face 332 attached to the second part 508 of the gear hub 208 may be positioned at an interface of the gear hub 208 and the gear 206 at another side of the gear. The diameter of the second thrust face 332 may be larger than that of the second part 508 of the gear hub 208. Each of the first thrust face 330 and the second thrust face 332 may be in face sharing contacts with the gear 206 on opposite sides of the gear 206. Since lubricating oil is delivered to the gear 206 and gear hub 208 via dedicated channels, holes may not be needed on the gear hub 208 for routing oil into an inner cavity of an enclosed drive shaft.

The first part 506 of the gear hub 208 may include a hollow interior 510 with a toothed inner wall 512 meshable with splines of a drive shaft. The second part of the gear hub 208 may also include a hollow interior shaped to receive an end of the drive shaft. A drive shaft of the HPFP may be inserted from an open end of the first part 506 of the gear hub and the drive shaft may extend to a closed end of the second part 508 of the gear hub. The spines of the drive shaft may be coupled to the complementary geometry of the toothed inner wall 512 of the first part 506. During operation of HPFP, the drive shaft may rotate, thereby driving the gear which facilitates in pressurizing fuel to be delivered to the fuel injectors.

In this way, the system of FIGS. 1-5B provides for a high-pressure fuel pump (HPFP) coupled to an engine fuel system, comprising: a controller with computer readable instructions stored on non-transitory memory that when executed during an engine-off condition, cause the controller to: flow pressurized lubricating oil from an oil inlet to a gear hub, a gear, a thrust face, a bushing, and a drive shaft of the HPFP through a first portion of a first vertical channel; flow lubricating oil from the oil inlet to a third vertical channel via a second portion of the first vertical channel and a second horizontal channel; and flow oil to the gear, the gear hub, another thrust face, an end cover, and another bushing from the third vertical channel via a bore in the end cover of the HPFP, the bore intersecting with the third vertical channel.

FIGS. 2-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, an element or step recited in the singular and proceeded with the word "a" or "an" should be understood as not excluding plural of said elements or steps, unless such exclusion is explicitly stated. References to "one embodiment" or "one example" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property. The terms "including" and "in which" are used as the plain-language equivalents of the respective terms "comprising" and "wherein." Moreover, the terms "first," "second," and "third," etc., are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for an engine, the system comprising:
a plurality of channels routing lubricating oil to a gear system and a drive shaft of a pump without flowing an entire volume of the lubricating oil through a cavity of the drive shaft, the plurality of channels extending to, and delivering a portion of the lubricating oil to, one side of the gear system via the cavity of the drive shaft and continuing around the cavity of the drive shaft to, and delivering another portion of the lubricating oil to, another side of the gear system via other than the cavity of the drive shaft.

2. The system of claim 1, wherein the gear system includes a gear enclosing a gear hub, the gear hub including a toothed inner wall meshed with splines of the drive shaft.

3. The system of claim 2, further comprising:
a first bushing at an interface of the gear hub and a first thrust face on a first side of the gear;
a second bushing at another interface of the gear hub and a second thrust face on a second side of the gear; and
an end cover of the pump on each of the first and second sides of the gear.

4. The system of claim 3, wherein the plurality of channels is drilled in the end cover of the pump from one side of the gear system to another side of the gear system, the plurality of channels including:
a first vertical channel originating from the first bushing and extending vertically away from the drive shaft;
a second horizontal channel originating from the first vertical channel and extending from the first side of the gear to the second side of the gear; and
a third vertical channel originating from the second horizontal channel and extending longitudinally along the end cover.

5. The system of claim 4, wherein the first vertical channel includes an inlet through which the lubricating oil enters the first vertical channel, the first vertical channel including a first section delivering a first portion of the lubricating oil to the first bushing, the gear hub, the first side of the gear, the first thrust face, and the drive shaft via an outlet of the first vertical channel, and a second section delivering a second portion of the lubricating oil to the second horizontal channel.

6. The system of claim 5, wherein the third vertical channel receives the second portion of the lubricating oil from the second horizontal channel.

7. The system of claim 6, further comprising a bore surrounding the gear hub including a groove along a circumference of the bore, the groove tangentially intersecting with the third vertical channel and the second portion of the lubricating oil entering the bore from the third vertical channel via the groove.

8. The system of claim 7, wherein the second bushing includes one or more holes in fluidic communication with the bore.

9. The system of claim 8, wherein the second portion of the lubricating oil entering the bore is delivered to each of the second side of the gear, the gear hub, the second thrust face, and the second bushing via the bore.

10. The system of claim 1, wherein the plurality of channels is off-centered relative to a central axis of the drive shaft.

11. The system of claim 1, wherein the pump is a high pressure fuel pump in a fuel line delivering pressurized fuel to a fuel rail.

12. A system for a high pressure fuel pump (HPFP), the system comprising:
a gear enclosing a gear hub;
a drive shaft meshed within the gear hub;
one or more bushings at interfaces of the gear hub and an end cover of the HPFP; and
a passage in the end cover of the HPFP for supplying pressurized lubricating oil to the gear, the gear hub, the one or more bushings, and the drive shaft, the passage extending to, and delivering a portion of the pressurized lubricating oil in the passage to, a first side of the gear hub and continuing around the gear from the first side of the gear hub extending to, and delivering another portion of the pressurized lubricating oil in the passage to, a second side of the gear hub.

13. The system of claim 12, wherein the passage includes a first vertical passage on the first side of the gear hub, a third vertical passage on the second side of the gear hub, and a second horizontal passage connecting the first vertical passage to the third vertical passage.

14. The system of claim 13, wherein the first vertical passage includes an inlet located along a length of the first vertical passage with the pressurized lubricating oil entering through the inlet traveling in two directions along the first vertical passage.

15. The system of claim 14, wherein the pressurized lubricating oil traveling in two directions includes a first portion of the pressurized lubricating oil traveling to a first bushing, the first side of the gear hub, a first side of the gear, a first thrust face, and the drive shaft via an outlet and a second portion of the pressurized lubricating oil traveling to the third vertical passage via the second horizontal passage.

16. The system of claim 15, wherein the third vertical passage tangentially intersects a bore surrounding the gear hub, the bore supplying oil from the third vertical passage to a second side of the gear, the second side of the gear hub, a second thrust face, the end cover, and a second bushing.

17. The system of claim 16, wherein the second bushing includes at least one through hole in fluidic communication with the bore.

18. A system for a high-pressure fuel pump (HPFP) coupled to an engine fuel system, the system comprising:
a controller with computer readable instructions stored on non-transitory memory that when executed during an engine-off condition cause the controller to:

flow pressurized lubricating oil from an oil inlet to a gear hub, a gear, a thrust face, a bushing, and a drive shaft of the HPFP through a first portion of a first vertical channel;

flow the pressurized lubricating oil from the oil inlet to a third vertical channel via a second portion of the first vertical channel and a second horizontal channel; and flow the pressurized lubricating oil to the gear, the gear hub, another thrust face, an end cover, and another bushing from the third vertical channel via a bore in the end cover of the HPFP, the bore intersecting with the third vertical channel.

19. The system of claim 18, wherein each of the first vertical channel, the second horizontal channel, and the third vertical channel are drilled in the end cover of the HPFP along a plane off-centered from that of a central axis of the drive shaft.

20. The system of claim 19, wherein the pressurized lubricating oil is supplied to the oil inlet from a sump in an engine.

* * * * *